United States Patent [19]

Burger et al.

[11] Patent Number: 5,630,941
[45] Date of Patent: *May 20, 1997

[54] PERMANENT HYDROPHILIC MODIFICATION OF FLUOROPOLYMERS

[76] Inventors: Wolfgang Burger, Böcklerweg 30, 81825 München; Klaus Lunkwitz, Georg-Schumann-Str. 6, 01187 Dresden; Heide-Marie Buchhammer, Winterbergstr. 81, 01237 Dresden, all of Germany

[ * ] Notice: The term of this patent shall not extend beyond the expiration date of Pat. No. 5,540,837.

[21] Appl. No.: 558,334

[22] Filed: Nov. 15, 1995

Related U.S. Application Data

[63] Continuation-in-part of Ser. No. 171,053, Dec. 21, 1993, Pat. No. 5,540,837.

[30] Foreign Application Priority Data

Dec. 23, 1992 [DE] Germany ............ 42 43 995.7

[51] Int. Cl.⁶ .................................................. B01D 29/00
[52] U.S. Cl. ............... 210/490; 210/500.27; 210/500.36; 428/315.7
[58] Field of Search ................. 210/490, 500.36, 210/500.21, 500.27, 506; 429/144; 264/48, 49, 41, 45.1, 45.5; 427/407

[56] References Cited

U.S. PATENT DOCUMENTS

| | | | |
|---|---|---|---|
| 3,390,007 | 6/1968 | Miller et al. | |
| 3,556,305 | 1/1971 | Shorr | 210/490 |
| 4,250,029 | 2/1981 | Kiser et al. | 210/490 |
| 4,359,510 | 11/1982 | Taskier | 429/144 |
| 4,618,533 | 10/1986 | Steuck | 428/315.7 |
| 5,130,024 | 7/1992 | Fujimoto et al. | 210/500.36 |
| 5,145,584 | 9/1992 | Swamikannu | 210/490 |
| 5,209,830 | 5/1993 | Abayasekara et al. | 210/500.36 |
| 5,209,850 | 5/1993 | Abayasekara et al. | 210/500.36 |
| 5,282,965 | 2/1994 | Urairi et al. | 210/500.36 |
| 5,540,837 | 7/1996 | Lunkwitz et al. | 210/490 |

*Primary Examiner*—Ana Fortuna
*Attorney, Agent, or Firm*—Gary A. Samuels

[57] ABSTRACT

A permanent hydrophilic modification for fluoropolymer substrates is described in which the substrate is coated with a film of a charged polyelectrolyte complex. The film has cationic and anionic components in which the charges on the components interact to form stable electrolytic bonds.

5 Claims, No Drawings

PERMANENT HYDROPHILIC MODIFICATION OF FLUOROPOLYMERS

CROSS-REFERENCE TO RELATED APPLICATIONS

This application is a continuation-in-part of application Ser. No. 08/171,053, filed Dec. 21, 1993, U.S. Pat. No. 5,540,837.

FIELD OF THE INVENTION

This invention relates to a permanent hydrophilic modification for fluoropolymers and the process for producing this modification.

BACKGROUND OF THE INVENTION

Due to excellent chemical and thermal stability properties of fluoropolymers, they are used in many areas of technology. However, a fluoropolymer having a hydrophobic surface has proven to be a disadvantage in certain applications such as liquid filtration. Pure fluoropolymers cannot be used for separating disperse particles in water because they cannot be wetted with water. In order to use them for separating substances from aqueous media, a number of methods have been developed to make the surface of the fluoropolymer wettable with water, thus making them hydrophilic.

Numerous proposals have been made for imparting a hydrophilic character to a fluoropolymer surface. For example, fluoropolymer membranes have been wetted with aqueous alcohol or ketone solutions. The hydrophilic properties for these membranes are maintained only in the wet state, thus a permanent hydrophilic property is not achieved. According to U.S. Pat. Nos. 4,525,374 and 4,839,298, the fluoropolymer membrane is impregnated with a mixture of solvent and surfactant. According to European Patent 175, 322, a membrane is impregnated with a hydrophilic propylene glycol monofatty acid ester. The disadvantage of these methods of treatment is that the surfactant is washed out during the use of the membrane, especially at high temperatures. It is also known from U.S. Pat. Nos. 4,298,002, and 4,908,236 that a microporous fluoropolymer membrane can be impregnated with a hydrophilic monomer and then polymerized. U.S. Pat. Nos. 4,113,912, 4,917,773, 4,618,533 and 4,506,035 describe impregnation of the fluoropolymer membrane with a hydrophilic monomer. Following impregnation, graft polymerization, crosslinking, a plasma treatment or a treatment with high energy radiation is performed for the purpose of fixation. However, it has been found that these methods lead to an irregular finish of the membrane and to an irregular crosslinking. In addition there is also the danger that the pores of a fluoropolymer membrane can become blocked. In Polymer Preprints 31 (1990) 1, M. S. Shoichet/T. J. McCarthy, U.S. Pat. No. 3,390,067 and European Patent 245,000, chemical pretreatment of the fluoropolymer surface with reducing reagents and then graft copolymerization are described. J. Appl. Polym. Sci., 26 (1990) 2637, E.-S. A. Hegazy, N. N. Taher, A. R. Ebaid and U.S. Pat. No. 4,734, 112 describe pretreatment of a fluoropolymer membrane with plasma, laser or by glow discharge. This is followed by a chemical reaction with a hydrophilic substance. These methods lead to a loss of mechanical stability of the membrane and to a nonhomogeneous modification of the area near the surface. European Patent Nos. 407,900 and 456,939 describe modification of a fluoropolymer membrane with a hydrophilic polymer and then chemical reaction of the hydrophilic groups. This method has the disadvantage that the membrane has a reduced solvent stability and there is a loss of the hydrophilic character at elevated temperatures due to reorientation effects and thermal instability of the functional groups. According to European Patent No. 408, 378 and U.S. Pat. No. 4,113,912, a fluoropolymer membrane is rendered hydrophilic by treating it with a hydrophilic polymer and then completing this hydrophilic polymer with a complexing agent. Although hydrophilic membranes produced in this way have a stabilized modification, binding of the hydrophilic components is inadequate and there is the danger of inactivation due to loss of the finish. European Patent No. 436,720 describes the use of polyelectrolytes consisting of polycationic and polyanionic compounds that can impart hydrophilic properties to certain substrates. However, it has been found that these complexes yield completely inadequate adhesion to fluoropolymer membranes. Polyelectrolyte complexes are also disclosed in East German Patent Nos. 280,257 and 280,258 which can induce a cationic modification of substrates. Here again, the adhesion is inadequate.

In summary, none of the references teach a permanent hydrophilic modification for fluoropolymers that also provides for adequate hydrophilic properties, chemical resistance, mechanical strength, water permeability and permanence.

There is a need for a permanent hydrophilic modification for fluoropolymers, especially fluoropolymer membranes that have an increased permanence and whereby at the same time the normally desirable properties such as chemical resistance and mechanical strength of the fluoropolymers are maintained.

SUMMARY OF THE INVENTION

A permanent hydrophilic modification for fluoropolymers is provided and comprises a fluoropolymer having a surface and a thin film of a charged polyelectrolyte complex that is formed on the surface of the fluoropolymer. The charged polyelectrolyte complex is comprised of at least one layer of a polycation and/or a cationically modified synthetic resin and a polyanion and/or anionically modified hydrophilic synthetic resin. The hydrophilic synthetic resin may contain one or more polyfunctional compounds. The fluoropolymer may be polytetrafluoroethylene. A process for making this modification is also provided.

DETAILED DESCRIPTION OF THE INVENTION

The present invention relates to a permanent hydrophilic modification for fluoropolymers and is characterized in that a thin film of a charged polyelectrolyte complex is formed on the surface of the fluoropolymer. This invention also provides for a process to produce a permanent hydrophilic modification of fluoropolymers, whereby a polycation and/or polycationically modified synthetic resin is applied to the surface of the fluoropolymer and a charged polyelectrolyte complex is formed by adding a polyanion and/or anionically modified synthetic resin and then the complex is heated to stabilize, or "fix", the resulting "ionic" bonds in the electrolyte complex.

The advantages of the modification according to this invention include first the simple process for production. For example, only aqueous or aqueous-alcoholic starting solutions that are free of other organic solvents are needed. These solutions also have good permeability, thermal stability and permanence and only small amounts are required for use and they also yield good applications for a variety of fluoropolymers with negative zeta potential. This process can be used for modification of a number of fluoropolymers having a negative zeta potential. Owing to the stability of the complex, detachment of the layer is minimized. A monolayer of the complex yields an optimum modification because the application of the polyanion to the substrate does not depend on the type or number of functional groups and thus the resulting zeta potential. For example, this means that even a fluoropolymer membrane with extremely small pores can be rendered adequately hydrophilic without causing blockage of the pore structure.

The modification according to this invention consists of a polycation which in a low concentration covers the surface of the fluoropolymer, which usually has a negative zeta potential, and imparts a positive zeta potential to the substrate. The second component which is essentially responsible for improving the hydrophilic properties is an anionic polymer molecule, preferably a polyanion with aliphatic or aliphaticlaromatic side chains. The modification according to this invention has a structure such that a hydrophilic polycation and/or a polycationic functionalized synthetic resin is applied to the surface of the fluoropolymer and adsorptive forces (physical or electrostatic adsorption) are responsible for the bond between the substrate and the polycation. The polyelectrolyte film has excess charges which impart a positive zeta potential to the treated polymer and are capable of reacting with additional components. This reaction is used in the next step to form a complex with the dissolved polyanions or synthetic resins.

The fluoropolymers are preferably modified with components that foster a high degree of order of the hydrophilic groups on the surface and impart hydrophilic properties to the substrate. Controlled complexing in combination with later thermal fixation impart the desired permanence to the modification and serve the purpose of reorienting the outermost hydrophilic component which has the excess charges. This component is capable of developing a film with water molecules, for example, by forming hydrogen bridges or entering into interactions with other polar components. By heating, the electrolyte complex is insolubilized. Fixing the charge complex on the originally hydrophobic fluoropolymer serves the purpose of enrichment, fixation and binding of other substrates to the surface. The type and number of ionically charged surface active groups can be varied.

Through a choice of suitable structured polycations, a permanent change in the charge of the polymer surface is achieved and by means of a reaction with polyanions or polyanion-active synthetic resins and subsequent fixation, a stable state or order which has an excess charge based on the existence of free ionic groups and which is responsible for the permanent hydrophilic effects is achieved. Coordinative molecule effects promote the orientation effect.

Due to this type of coating, permanent modifications are achieved with a minimum amount of components.

Monolayers and limited multilayers are preferred. Depending on the modification varient selected, especially permanent hydrophilic effects can be achieved.

It is advantageous in producing and using the modification according to this invention for the substrate to be pretreated and to be free of finishing agents, soluble residues of the processing operation and impurities.

It has also proven to be advantageous to use fluoropolymers that have a more negative zeta potential in comparison with pure fluoropolymers due to the incorporation of functional end groups containing carboxyl groups such as those described in German Patent No. 4, 117,281. This invention is not limited to the use of a certain fluorocarbon polymer as the starting material. Polytetrafluoroethylene, copolymers of polytetrafluoroethylene with perfluorovinyl ethers, hexafluoropropylene, monochlorotrifluoroethylene or ethylene, polyvinyl fluoride or polyvinylidene fluoride can be used. In addition, compounds such as filled (or impregnated) fluoropolymers may also be used. Fillers such as glass powder, glass fibers, silicates, graphite, pigments, metal powders, etc., that impart a more negative zeta potential to the membrane, can be used.

As a result of the polycation modification, the polymer as well as the filler undergoes a charge reversal at the surface in the first step.

This type of modification is especially advantageous for membranes which are then treated to make them hydrophilic on both the inside and outside surfaces. Especially favorable fluoropolymer membranes include uniaxially or biaxially drawn polytetrafluoroethylene membranes having a pore size of 0.01 µm to 15 µm. These membranes have a symmetrical or asymmetrical structure of the pore size distribution and a porosity of 40% to 95%. The membranes have an MVTR value (moisture vapor transport value) of 30,000 to 70,000 $g/m^2$ per day.

Development of the pore structure of the membrane is not limited to a certain technology. The pore-forming methods may include drawing, extraction of a second component, dissolving out one component, using the nuclear tracing technique and forming bubbles.

The water-soluble polycation must cover the entire surface of the substrate within the shortest possible period of time. In the case of membranes the internal pore surface must also be covered and the charge of the substrate must be reversed (positive zeta potential) and subsequently a positive excess charge of the substrate initiated, wherein a thermal fixation step may be preferred. This charged substrate must have a sufficient number of free and readily accessible reactive groups that are capable of forming a stable complex with polyanions and suitable synthetic resins. These functional compounds must be capable of developing a high state of order at the surface due to preorientation effects in the molecule and during complexing and due to a subsequent fixation process and they must have an excess charge. This orientation can also be achieved by applying the Langmuir-Blodgent technique to hydrophobic polymer surfaces. The result of modification of the polymer is a modified surface that is more hydrophilic and contains a greater amount of charged groups in comparison with the starting polymer. An excess of polyanions must be used for this procedure in which case some of the anionic groups are capable of irreversible complexing with the cationically modified polymer but most of the anionic groups are needed to effect the hydrophilic properties.

Preferred modification with at least one monolayer of the complex can be obtained by:

(a) adsorbing the polycation on the substrate surface and complexing the layer with synthetic resins containing at least one polyfunctional compound, preferably two polyfunctional compounds, whereby at least one of the polyfunctional compounds contains ionic groups or diol groups and has an excess charge after fixation; or (b) most preferably adsorbing the polycation on the surface of the substrate and then complexing the layer with at least one polyanion having excess charges after fixation or;

(c) adsorbing a cationically modified hydrophilic synthetic resin on the inside and outside surface of the substrate and then complexing the layer with at least one polyanion that still has excess charges after fixation.

Preferred polycations include quaternized polyacrylamides, polyvinylpyrrolidones, polyvinylamines, polyallylamines, polyethyleneimines, polyvinylpyridine, NAFION® with quaternized end groups, polydimethyl diallyammonium chloride and ionic synthetic and natural polymers having quaternized end groups containing nitrogen. NAFION® is a peffluorinated membrane commercially available from E. I. DuPont de Nemours, Inc.

Preferred polyanions include polyethylenesulfonate, polystyrenesulfonate, NAFION® solution, perfluorinated ionomers. They are used preferably in the form of their alkali salts.

Preferred complexes consist of polyallylamine polystyrenesulfonate, polyallylamine polyacrylic acid, polyvinylamine polystyrenesulfonate, polyvinylamine polyacrylic acid and polyethyleneimine polyacrylic acid and polyethyleneimine polystyrenesulfonate. The compounds that can be used with the polycation include polyanions such as:

dispersions with the polyvinyl alcohol, acrylates, ethylene-methacrylate copolymers, ethylene-methacrylate-vinyl acetate copolymers copolymers of maleic anhydride polymers or copolymers of (meth)acrylic acid.

Polyfunctional compounds that can enter into chemical bonds with the polycation include compounds that have multiple bonds capable of addition, epoxy groups, aldehyde groups, isocyanate groups and acid anhydride groups and acyl halide groups.

Water is the preferred solvent for the polyelectrolytes although other solvents such as low molecular weight alcohols may also be used alone or in combination with water. Depending on the type of polyelectrolytes used (molecular weight, charge density, type of functional groups) and the reaction conditions (temperature, pH, reaction time), an optimum end group activity and coverage of the surface can thus be achieved for each substrate.

The reaction time varies between 10 seconds and 1 hour. The reactivity of the functional groups can be influenced on the basis of the pH. An optimum value for complexing is between a pH of 4 and 8. After adsorption of the polyelectrolyte onto the substrate—a sufficient period of time until development of a uniform layer on and in the surface of the substrate must be assured—the process is repeated or if there is adequate coverage, excess polycation is removed by squeezing or by means of treatment with water. Complexing in turn takes place out of an aqueous alcoholic solution whereby:

(a) polycations are applied, for example, from a 0.01 to 30% aqueous solution. These solutions preferably contain 0.1 to 20% polycation.

(b) modified synthetic resins such as those of 0.1 to 50% aqueous solutions or dispersions are used. These solutions preferably contain 5 to 60 grams of synthetic resin per 1000 ml water.

(c) polyanions, for example, those applied from 0.01 to 30% aqueous solutions. These solutions preferably contain 0.02 to 20% polyanion.

Modification of the complex is performed at temperatures in the range of 10° to 80° C., especially in the range between 40° and 60° C. The reaction can take place in one or two steps. A one-step reaction means that the polyelectrolyte or the cationic synthetic resin and the polyanion are used in a bath. This is especially true in case (b), as specified above, (i.e., when using a synthetic resin). A two-step process is preferred. By means of a stepwise treatment of the substrate in separate reaction solutions, uncontrolled complexing in solution is prevented and thus an optimum hydrophilic modification is achieved at a low starting concentration of the reaction solutions. Pretreatment of the polymer in an aqueous alcoholic polycation solution has proven to be advantageous. After modification of the fluoropolymer, a fixation process is performed at temperatures between 110° and 180° C. The fixation time depends on the substrate and must be adapted to the given polyelectrolyte system. It is preferable to work with periods between 5 seconds and 15 minutes.

This invention is demonstrated below by way of examples. The following parameters are used and described hereinbelow:

Zeta potential

To measure the zeta potential of the membranes an electrokinetic measurement system EKA from the company PAAR was used. The analysis is performed in first approximation according to the method of FAIRBROTHER/MASTIN. This method relies on the formula:

$$\xi = \frac{\mu\rho \cdot \eta \cdot \wp\beta}{\Delta P \cdot \epsilon \cdot \epsilon_o}$$

wherein:

$\xi$ is the zeta potential $\mu\rho$ is the flow potential $\epsilon_o$ is the Influence Constant $\wp\beta$ is the specific electrical conductiveness of the measuring solution.

$\epsilon$ is the relative dielectric constant of the liquid.

$\eta$ is the dynamic viscosity of the liquid $\Delta P$ is the pressure difference between the oncoming flowside and the outgoing flowside.

According to this method, for the majority of experiments and quality control measurements, in which the samples are always measured under the same parameters, the only measurements necessary are those of the flow potential and specific electrical conductiveness of the measuring solution.

Inlet Pressure of Water

The pressure necessary to drive water into the pore structure of the dried membrane was determined. To do so, the pressure of the test liquid was increased slowly with a pressure gradient of 10 mbar/sec at the lower side of the membrane.

Contact angle

The contact angle (also known as wetting angle) of the membrane with respect to a droplet of water at 17° C. was determined with a contact angle measurement device G1 from the company KRUSS.

EXAMPLE 1

A membrane of expanded polytetrafluoroethylene (ePTFE) (GORE-TEX® membrane commercially available from W. L. Gore & Associates, Inc.) (2 μm pore size diameter, zeta potential according to the oncoming flow method -17 mV) was wetted with isopropanol and placed in a 0.1N solution of polyallylamine (PAA). After 10 minutes at a temperature of 60° C., the membrane was removed from this solution, excess PAA was removed with water and then the membrane was dried at 130° C. for 30 minutes. The increase in weight of the membrane amounted to 1.5% and a zeta potential of +20 mV was determined according to the oncoming flow method. This membrane was then placed in an aqueous alcoholic $10^{-1}$N solution of polyacrylic acid at 60° C., removed after 10 minutes, squeezed and heated for 10 minutes at 160° C. Results are shown in Table 1.

EXAMPLE 2

A membrane of expanded PTFE (2 µm pore diameter) (GORE-TEX® membrane) was wetted with isopropanol and placed in a 0.1N solution of polyallylamine (PAA). After 10 minutes at a temperature of 60° C., the membrane was removed from this solution, excess PAA was removed with water and the membrane was dried for 30 minutes at 130° C. The weight gain by the membrane amounted to 1.5% and a zeta potential of +2–.1 mV was determined according to the oncoming flow method.

This membrane was then placed in an aqueous alcoholic $5\times10^{-3}$N solution of the sodium salt of polystyrenesulfonic acid at 60° C. Results are shown in Table 1.

EXAMPLE 3

A membrane of expanded PTFE (GORE-TEX® membrane) (pore diameter 2) was wetted with isopropanol and placed in a 0.1N solution of polyallylamine (PAA). After 10 minutes at a temperature of 60° C., the membrane was removed from this solution, excess PAA was removed with water and the membrane was dried for 30 minutes at 130° C. The weight gain by the membrane amounted to 1.3%. This membrane was then placed in an aqueous alcoholic 1% solution of NAFION\ at 60° C., removed after 10 minutes, squeezed and heated for 10 minutes at 160° C. Results are shown in Table 1.

EXAMPLE 4

A membrane of expanded PTFE (GORE-TEX® membrane) (2 µm pore diameter) was wetted with isopropanol and placed in a 0.1N solution of Polymin G100 (PEI). After 10 minutes at a temperature of 60° C., the membrane was removed from this solution, any excess polymine was removed with water and the membrane was then dried for at 130° C. for 30 minutes. The weight gain by the membrane amounted to 1%. This membrane was then placed in an aqueous alcoholic 0.1N solution of polyacrylic acid at 60° C., removed after 10 minutes, squeezed and heated for 10 minutes at 160° C. Results are shown in Table 1.

EXAMPLE 5

A membrane of expanded PTFE (1 µm pore diameter) (GORE-TEX® membrane) with an increased carboxyl group content was pretreated in a solution of 100 parts isopropanol and 50 parts of a 0.1N PAA solution. Excess PAA was removed by squeezing and the membrane was dried for 10 minutes at 130° C. Next, the membrane was placed in a 0.1N aqueous alcoholic polystyrene sulfonate solution for 10 minutes at a temperature of 60° C. and heated for 10 minutes at 160° C. The weight gain by the membrane amounted to 3.4%. Results are shown in Table 1.

EXMAPLE 6

A membrane of expanded PTFE (2 µm pore diameter) (GORE-TEX® membrane) was pretreated with a solution of 100 parts isopropanol and 50 parts of a 0.1N PAA solution for 10 minutes at 60° C. and then placed in a 0.1N PAA solution for 10 more minutes at 60° C. Any excess PAA was removed by squeezing and the membrane was placed in a 0.5N polyacrylic acid solution for 10 minutes at 60° C. Next the membrane was tempered at 160° C. for 10 minutes. The weight gain by the membrane amounted to 7.5%. Results are shown in Table 1.

EXAMPLE 7

A membrane of expanded PTFE (pore diameter 2 µm) (GORE-TEX® membrane) was pretreated for 10 minutes at 60° C. in a solution of 100 parts isopropanol and 50 parts of a 0.1N PAA solution and then was placed for 10 minutes more in a 0.1N PAA solution at 60° C. Any excess PAA was removed by squeezing, the membrane was dried for 10 minutes at 130° C. and then placed in a 0.1N polystyrene sulfonate solution for 10 minutes at 60° C. Next the membrane was tempered for 10 minutes at 160° C. The weight gain by the membrane amounted to 5.0%. Results are shown in Table 1.

EXAMPLE 8

A membrane of expanded PTFE (GORE-TEX® membrane) with an increased carboxylic acid group content (pore diameter 1 µm) was pretreated for 10 minutes at 60° C. in a solution of 100 parts isopropanol and 50 parts of a 0.1N PAA solution and then placed in a 0.1N PAA solution for 10 minutes more at 60° C. Excess PAA was removed by squeezing, and the membrane was placed in a 0.5N polyacrylic acid solution for 10 minutes at 60° C. Next the membrane was tempered for 10 minutes at 160° C. The increase in weight of the membrane amounted to 6.5%. Results are shown in Table 1.

EXAMPLE 9

A membrane of expanded PTFE (GORE-TEX® membrane) (2 µm pore diameter) was pretreated with a solution of 100 parts isopropanol and 50 parts of a 0.1N polyethyleneimine solution for 10 minutes at 60° C. and then placed for 10 more minutes at 60° C. in a 0.1N PEI solution. Excess PEI was removed by squeezing and the membrane was placed in a 0.5N polyacrylic acid solution for 10 minutes at 60° C. Next the membrane was heated for 10 minutes at 160° C. The increase in weight of the membrane amounts to 6.2%. Results are shown in Table 1.

EXAMPLE 10

A membrane of expanded PTFE (GORE-TEX® membrane) with an increased carboxylic acid group content (pore diameter 1 µm) was pretreated for 10 minutes at 60° C. in a solution of 100 parts isopropanol and 50 parts of a 0.1N PEI solution and then placed for 10 minutes more at 60° C. in a 0.1N PEI solution. Excess PEI was removed by squeezing, and the membrane was placed in a 0.5N polyacrylic acid solution for 10 minutes at 60° C. Next the membrane was heated for 10 minutes at 160° C. The increase in weight of the membrane amounted to 6.4%. Results are shown in Table 1.

EVALUATION OF PERFORMANCE

EXAMPLE A

A membrane of expanded PTFE (1 µm pore diameter) (GORE-TEX® membrane) was modified according to Example 1. Instead of the heating or tempering operation, the membrane was dried for 30 minutes at 110° C. This modification could easily be washed off in water.

EXAMPLE B

A membrane of expanded PTFE (2 µm pore diameter) (GORE-TEX® membrane) modified according to Example 5 was boiled in 200 ml water for 30 minutes under reflux conditions. The weight loss amounted to <0.05%.

TABLE 1

| Name | Pretreatment | Inlet pressure of water in bar | Wetting angle with water in degrees | MTVR in g/m² day | Pore size in μm |
|---|---|---|---|---|---|
| GORE-TEX (2 μm) | No pretreatment (control) | 0.64 | 130 | 72000 | 2 |
| GORE-TEX (1 μm) | No pretreatment (control) | 1.60 | 121 | 64000 | 1 |
| Example 1 | 30 min. 130° C.[1] | 0.43 | 122 | 73000 | 2 |
| Example 2 | 30 min. 130° C.[1] | 0.44 | 123 | 64000 | 2 |
| Example 3 | 30 min. 130° C.[1] | 0.50 | 126 | 48000 | 2 |
| Example 4 | 30 min. 130° C.[1] | 0.39 | 103 | 43000 | 2 |
| Example 5 | yes 10 min. 130° C. | 0.79 | 107 | 57000 | 1 |
| Example 6 | yes | 0.39 | 91 | 43000 | 2 |
| Example 7 | yes 10 min. 130° C. | 0.45 | 95 | 48000 | 2 |
| Example 8 | yes | 1.20 | 101 | 38000 | 1 |
| Example 9 | yes | 0.28 | 107 | 47000 | 2 |
| Example 10 | yes | 21.11 | 62 | 47000 | 1 |

[1]Temperature and time of thermal fixation of the polycation component.
yes Pretreatment in dilute aqueous alcoholic polycation solution.

We claim:

1. A permanently hydrophilically modified fluoropolymer comprising a fluoropolymer having a surface, said surface having a thin film of a charged polyelectrolyte complex formed on the surface of the fluoropolymer and in which the polyelectrolyte complex consists essentially of a complex of:

(a) a water soluble polycation and/or a cationically modified synthetic resin; and (b) a water soluble anionically modified hydrophilic synthetic resin.

2. The fluoropolymer of claim 1 wherein the fluoropolymer has a porous membrane structure.

3. The fluoropolymer of claim 1 or 2 wherein the complex is a complex of a polycation and an anionically modified hydrophilic synthetic resin.

4. The fluoropolymer of claim 1 or 2 wherein the complex is a complex of a cationically modified hydrophilic synthetic resin and an anionically modified hydrophilic synthetic resin.

5. The fluoropolymer of claim 1 or 2 wherein the fluoropolymer is polytetrafluoroethylene (PTFE).

* * * * *